(12) United States Patent
Rutenbeck et al.

(10) Patent No.: US 7,141,202 B2
(45) Date of Patent: Nov. 28, 2006

(54) METHOD AND APPARATUS FOR BLOW MOLDING A BOTTLE WITH A PUNCHED HOLE IN A MOLDED NECK RECESS

(75) Inventors: Mark M. Rutenbeck, Clinton, IA (US); Brent Schrader, Clinton, IA (US)

(73) Assignee: Custom-Pak, Inc., Clinton, IA (US)

( * ) Notice: Subject to any disclaimer, the term of this patent is extended or adjusted under 35 U.S.C. 154(b) by 91 days.

(21) Appl. No.: 11/031,214

(22) Filed: Jan. 7, 2005

(65) Prior Publication Data

US 2005/0121836 A1  Jun. 9, 2005

Related U.S. Application Data

(62) Division of application No. 10/212,199, filed on Aug. 2, 2002, now Pat. No. 7,021,920.

(60) Provisional application No. 60/334,523, filed on Nov. 30, 2001.

(51) Int. Cl.
B29C 49/50 (2006.01)
B29C 49/54 (2006.01)

(52) U.S. Cl. .................. 264/531; 264/534; 264/155

(58) Field of Classification Search ............... 264/531, 264/534, 155
See application file for complete search history.

(56) References Cited

U.S. PATENT DOCUMENTS 3,821,344 A   6/1974  Peters ..................... 264/534
3,973,896 A   8/1976  Peters ..................... 425/536
4,116,608 A   9/1978  Uhlig ...................... 425/525
4,378,328 A   3/1983  Przytulla et al. ........... 264/534
4,419,323 A  12/1983  Winchell .................. 264/523
4,550,009 A  10/1985  Burkel .................... 264/529
6,375,891 B1  4/2002  Nishikawa et al. ......... 264/534
6,500,379 B1 12/2002  Wrobbel .................. 264/515
2003/0003252 A1 1/2003 Yun et al. ................ 428/36.9

FOREIGN PATENT DOCUMENTS

JP         07214654 A    8/1995

*Primary Examiner*—Suzanne E. McDowell
(74) *Attorney, Agent, or Firm*—St. Onge Steward Johnston & Reens LLC

(57) ABSTRACT

A method for blow molding bottles having a hole formed in a molded interior recess extending from a top face of a bottle neck includes the steps of: (i) providing a mold having a neck forming cavity with an end flange surface therein; (ii) disposing a parison of molten material within the mold; (iii) introducing pressurized fluid into the parison to expand it against the mold walls, thereby forming a final shape of the bottle; (iv) forming the interior recess in the bottle by advancing a recess forming rod through a hole in the end flange surface and into the neck forming cavity; and (v) creating a dispensing hole in the interior recess by advancing a punch through a hole in an end face of the recess forming rod.

9 Claims, 2 Drawing Sheets

METHOD AND APPARATUS FOR BLOW MOLDING A BOTTLE WITH A PUNCHED HOLE IN A MOLDED NECK RECESS

RELATED APPLICATIONS

This patent application is a divisional of U.S. patent application Ser. No. 10/212,199 filed Aug. 2, 2002, now U.S. Pat. No. 7,021,920, and which application claims the benefit of, under Title 35, United States Code, Section 119(e), U.S. Provisional Patent Application No. 60/334,523, filed Nov. 30, 2001.

FIELD OF THE INVENTION

The present invention relates to a method and apparatus for blow molding plastic bottles, and in particular to a method and apparatus for blow molding bottles having a hole formed in a molded interior recess extending from the top face of the bottle neck.

BACKGROUND OF THE INVENTION

In the blow molding of conventional bottles, most of the top face of the neck is open to permit easy pouring of the contents of the bottle. The open portion is surrounded by a flat flange, adjacent and perpendicular to the threaded sidewall of the neck, and this flange is used as a sealing surface for the underside of a threaded or crimped bottle cap. Many methods familiar to practitioners of the blow molding process are known for the formation of these neck openings and flanges.

However, it is sometimes advantageous to form a molded recess extending from the top face of the neck and within the outer neck diameter, and to provide an opening within this recess through which to dispense the contents of the bottle. Referring to the attached figures, FIG. 1 shows a perspective view of such a bottle design. More specifically, FIG. 2 shows in section the neck and surrounding area of the bottle. The outer neck diameter 10 abuts a top flange 11 which in turn encircles a center recess 12 consisting of side walls 13, a bottom wall 14, and a dispensing hole 15 through the bottom wall 14. An example of such a construction is a bottle containing a liquid cleaner or protective coating which must be dispensed through an applicator attached to a cleaning or coating machine. In the example illustrated in FIG. 2, the center recess 12 retains a circular rubber gasket 16 with a hole through its center generally matching the hole 15 in the bottom wall 14 of the center recess 12.

The bottle as shipped from the filler is typically closed by a screw cap (not shown), the underside of which seals off against flange 11. The user of the fluid in the bottle removes and sets aside the screw cap. He or she then affixes the bottle to the applicator tool, shown in section in FIG. 3, by twisting the bottle neck onto bayonet joint projections 17 molded on the inner sides 18 of the bottle neck receiving recess 19 of the applicator. Gasket 16 then engages and seals against a metering hub assembly 20 in the recess 19.

Until the present time it has not been possible to mold such a bottle without a secondary operation. One choice has been to drill or punch the center hole after molding, increasing cost and introducing chips or other contamination into the bottle. An equally undesirable alternative has been to mold the center recess section separately and to attach it to the inner surface of the bottle neck, also increasing cost and introducing the risk of leakage.

What is desired, therefore, is a method and apparatus for blow molding bottles having a hole formed in a molded interior recess extending from the top face of the bottle neck in which the complete neck and recess portion of the bottle, including the dispensing hole, are formed as a single operation during the molding cycle.

SUMMARY OF THE INVENTION

Accordingly, it is an object of the present invention to provide a method and apparatus for blow molding bottles having a hole formed in a molded interior recess extending from the top face of the bottle neck.

Another object of the present invention is to provide a method and apparatus for blow molding bottles having the above characteristics and which dispenses with the need for secondary operations.

A further object of the present invention is to provide a method and apparatus for blow molding bottles having the above characteristics and which allows for the complete neck and recess portion of the bottle, including the dispensing hole, to be formed as a single operation during the molding cycle.

These and other objects of the present invention are achieved by provision of an apparatus for blow molding bottles having a hole formed in a molded interior recess extending from a top face of a bottle neck. The apparatus includes a mold having a neck forming cavity defined by an outer peripheral wall and an end flange surface. The mold includes a hole in the end flange surface of the neck forming cavity. A recess forming rod is slideably disposed within the hole in the mold, the recess forming rod slideable within the hole in the mold from an initial position wherein a face of the recess forming rod is withdrawn into the hole in the mold to an extended position wherein the face of the recess forming rod protrudes into the neck forming cavity of the mold so as to create the molded interior recess in the top face of the bottle neck. The recess forming rod has a hole therein in which a punch is slideably disposed. The punch is slideable within the hole in the recess forming rod from an initial position wherein a face of the punch is withdrawn into the hole in the mold to an extended position wherein the face of the punch protrudes beyond the face of the recess forming rod into the neck forming cavity of the mold so as to create the hole in the interior recess in the top face of the bottle neck.

Preferably, the punch has an undercut in the face thereof so as to retain a slug of material created as the hole in the interior recess in the top face of the bottle neck is created. It is also preferable that the punch has an inner channel formed therein to permit passage therethrough of pressurized air to eject the slug.

The mold preferably includes a second hole in the end flange surface of the neck forming cavity in which a needle is slideably disposed. The needle is slideable within the second hole in the mold from an initial position wherein a tip of the needle is withdrawn into the second hole in the mold to an extended position wherein the tip of the needle protrudes into the neck forming cavity of the mold such that pressurized air is introduced into the bottle during molding.

The face of the punch preferably protrudes beyond the face of the recess forming rod. In the initial position the face of the recess forming rod is most preferably withdrawn into the hole in the mold by about ¼ inch, and the face of the punch protrudes beyond the face of the recess forming rod by about 3/16 inch. It is also preferable that a portion of the recess forming rod protruding into the neck forming cavity of the mold in the extended position is frustoconical in shape. Preferably, the recess forming rod and the punch are slideable along axes parallel to each other, and most preferably, the recess forming rod and the punch are coaxial. In the embodiment where a needle is provided, the needle, the recess forming rod and the punch are preferably slideable along axes parallel to each other.

In another aspect of the invention a method for blow molding bottles having a hole formed in a molded interior recess extending from a top face of a bottle neck is provided. A parison of molten material is disposed within a mold having a neck forming cavity with an end flange surface therein, and pressurized fluid (such as air) is introduced into the parison to expand it against the mold walls, thereby forming a final shape of the bottle. The interior recess in the bottle is formed by advancing a recess forming rod through a hole in the end flange surface and into the neck forming cavity. Next, a dispensing hole is created in the interior recess by advancing a punch through a hole in an end face of the recess forming rod. The recess forming rod is allowed to remain in its advanced position while the molded bottle cools and solidifies. The punch is retracted while retaining a slug created during formation of the dispensing hole on an undercut in the punch thereby removing the slug from inside the bottle. The recess forming rod is retracted and pressurized air is permitted to drain from the bottle. Pressurized air is injected through an inner channel in the punch in order to blow the slug off the end of the punch.

The invention and its particular features and advantages will become more apparent from the following detailed description considered with reference to the accompanying drawings.

DETAILED DESCRIPTION OF AN EMBODIMENT OF THE INVENTION

Figure 1:
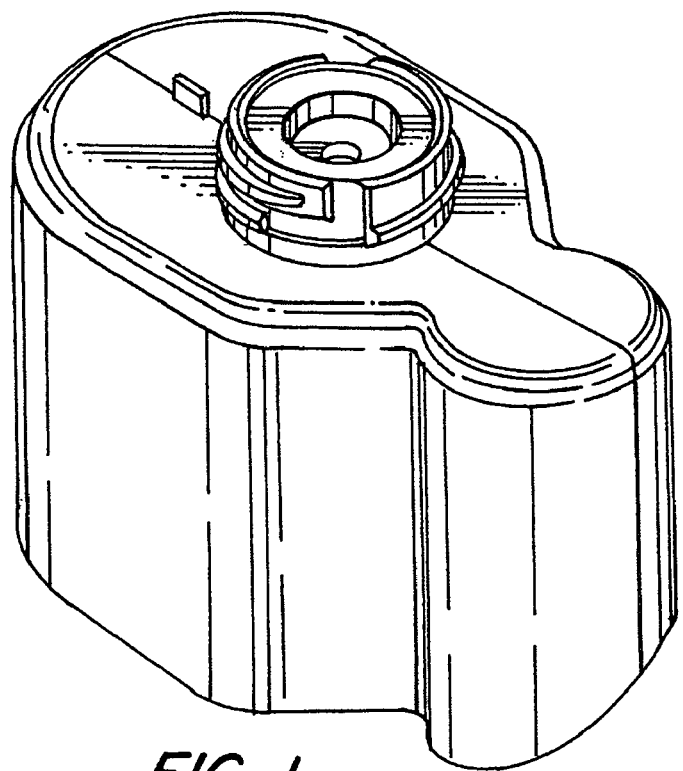
FIG. 1 is a perspective view of a bottle having a hole formed in a molded interior recess extending from the top face of the bottle neck.
Figure 2:
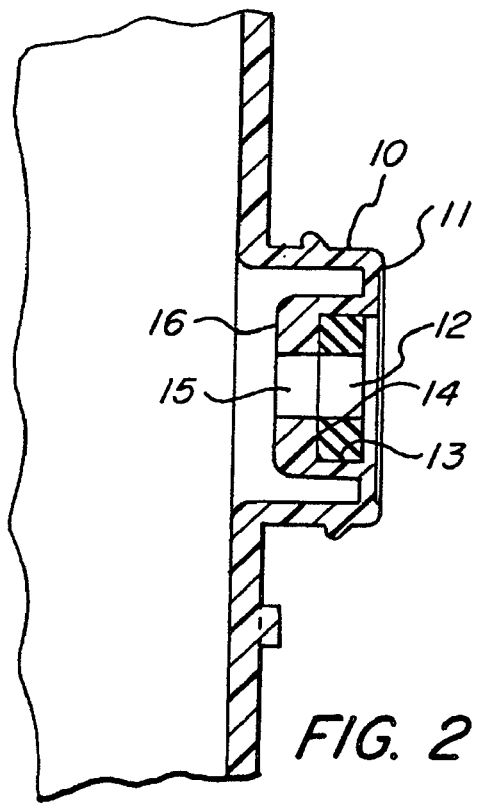
FIG. 2 is a partially cross-sectional view of the neck portion of the bottle of FIG. 1.
Figure 3:
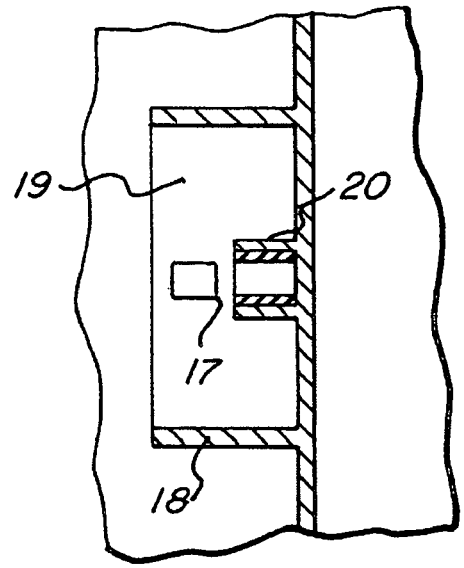
FIG. 3 is a partially cross-sectional view of the receiving recess portion of an applicator tool for receiving the bottle of FIG. 1.
Figure 5:
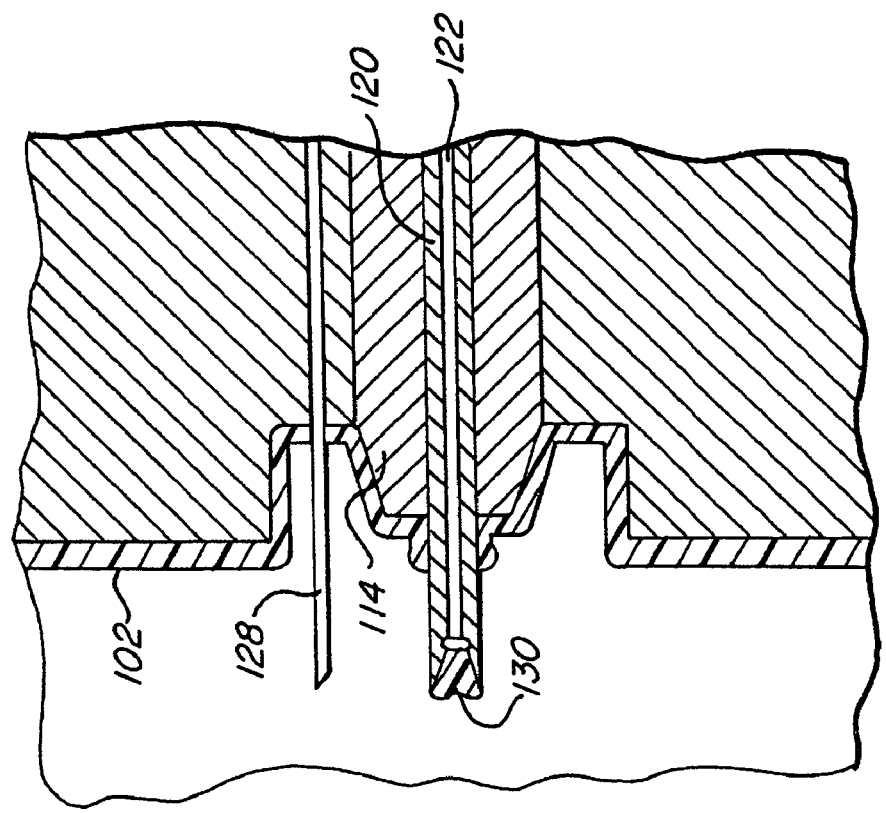
FIGS. 4 and 5 are partially cross-sectional views illustrating a method and apparatus for blow molding the bottle of FIG. 1 in accordance with one embodiment of the present invention.
Figure 4:
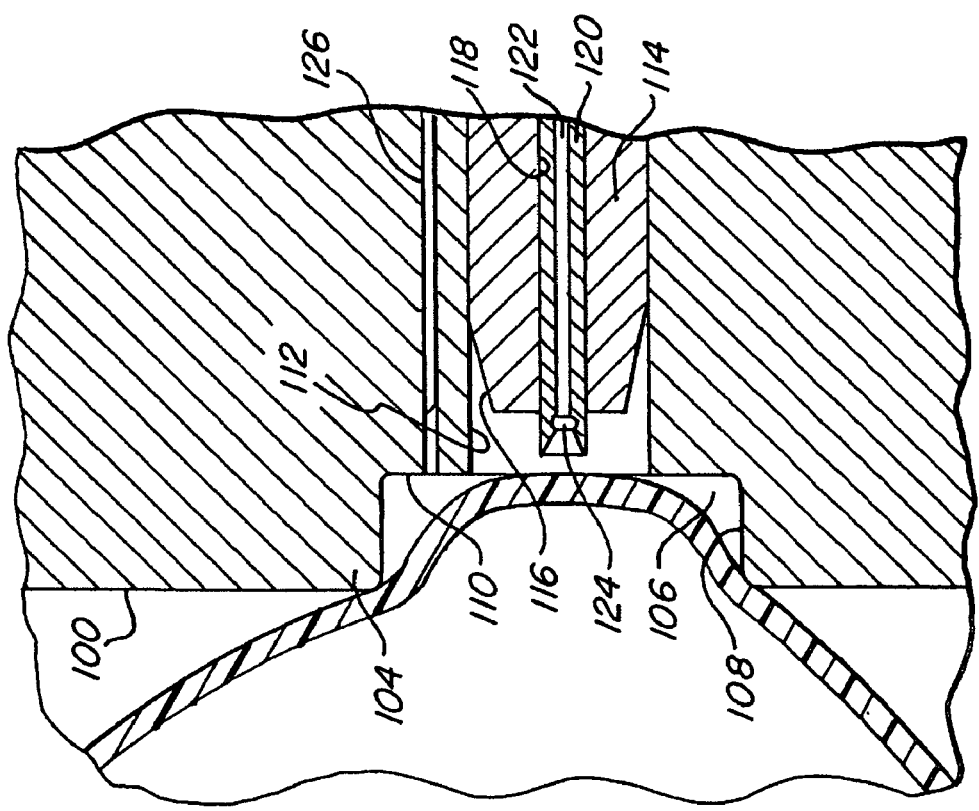

Referring now to FIGS. 4 and 5, a method and apparatus for blow molding bottles having a hole formed in a molded interior recess extending from the top face of the bottle neck in accordance with the present invention is shown. In FIG. 4, a schematic section of the mold 100 for forming the bottle is shown as it is closing. Molten plastic 102 in parison form rests generally inside the closed mold cavity which forms the outside shape of the bottle, or in two pinch-off relief areas 104 adjacent to the neck-forming cavity 106 in mold 100. Neck forming cavity 106 is defined by an outer peripheral wall 108 which is typically generally cylindrical and an end flange surface 110.

Mold 100 includes a hole 112 therein adjacent to end flange surface 110 of neck-forming cavity 106, with a recess forming rod 114 slideably disposed therein such that recess forming rod 114 is slideable toward and away from neck-forming cavity 106. Recess forming rod 114 preferably includes a frustoconical end portion 116, and the face thereof is preferably recessed from flange surface 110, most preferably by about ¼ inch, when recess forming rod 114 is in an initial position (shown in FIG. 4).

Recess forming rod 114 includes a hole 118 therein with a punch 120 slideably disposed therein such that punch 120 is slideable toward and away from neck-forming cavity 106. Preferably, recess forming rod 114 and punch 120 are slideable along axes parallel to each other. The face of punch 120 preferably extends beyond the face of recess forming rod 114, most preferably by about 3/16 inch when punch 120 and recess forming rod 114 are in an initial position (shown in FIG. 4). Punch 120 is preferably hollow, including an inner channel 122, to permit passage through it of pressurized air which will subsequently be used to remove a punched slug from the face of punch 120 as is discussed more fully below. Punch 120 also preferably contains a slight interior undercut 124 to retain the punched slug in position for the removing air to act on it when the mold is opened again, also as is discussed more fully below.

Mold 100 also includes a hole 126 therein adjacent to hole 112 and to end flange surface 110 of neck-forming cavity 106 with a needle 128 slideably disposed therein such that needle 128 is slideable toward and away from neck-forming cavity 106. Preferably, needle 128, recess forming rod 114 and punch 120 are slideable along axes parallel to each other. The tip of needle 128 is preferably withdrawn into hole 126 when needle 128 is in an initial position (shown in FIG. 4).

Referring now to FIG. 5, after the mold closes, as the molding cycle proceeds, needle 128 pierces the wall of molten plastic 102 and introduces pressurized fluid into the parison and expand it against the cooled cavity walls, thereby forming the final shape of the bottle. Generally simultaneously, recess forming rod 114 is advanced, by fluid pressure, to a forward stop. Pressurized air blows molten plastic 102 around recess forming rod 114, forming the outline of the center recess of the bottle. Subsequent to this operation, punch 120 is advanced, also by fluid pressure, to punch out a slug 130 in the center of the center recess, thereby creating a dispensing hole. Punch 120 retracts almost immediately thereafter. Needle 128 and recess forming rod 114 remain in their respective extended positions, as shown in FIG. 5, while the molded part cools and solidifies, after which they are withdrawn, permitting pressurized air to drain from the part through hole in the part created by needle 128.

The punched out slug 130 is retained on undercut 124 in punch 120, which further retracts with recess forming rod 114, thereby removing slug 130 from inside the bottle. The mold is then opened and the solidified part ejected. After ejection is complete, pressurized air is injected through the inner channel 122 in punch 120, blowing slug 130 off the end of punch 120. Slug 130 may then be reclaimed or discarded.

After part and slug ejection is complete, punch 120 and recess forming rod 114 advance together until they reach their respective initial positions as shown in FIG. 4. Another molten plastic 102 parison is placed between the open cavity halves, and the mold is again closed to begin a second cycle.

The present invention, therefore, provides a method and apparatus for blow molding bottles having a hole formed in a molded interior recess extending from the top face of the bottle neck which dispenses with the need for secondary operations, and which allows for the complete neck and recess portion of the bottle, including the dispensing hole, to be formed as a single operation during the molding cycle It will be seen that the present invention is in no way limited to the embodiments illustrated, and the particular arrangement of parts and features herein described are not intended to exhaust all possible arrangements of parts and features. For example, the bottle could be blown through the center hole rather than through the vent hole; the punched slug could be ejected mechanically instead of by air pressure; various ratios of cross-section are obtainable; interference surfaces other than a bayonet joint can be utilized; and non-threaded bottle closures may be used. Indeed, many other modifications and variations will be ascertainable to those skilled in the art.

What is claimed is:

1. A method for blow molding bottles having a hole formed in a molded interior recess extending from a top face of a bottle neck, said method comprising the steps of:
    providing a mold having a neck forming cavity with an end flange surface therein;
    disposing a parison of molten material within the mold;
    introducing pressurized fluid into the parison to expand it against the mold walls, thereby forming a final shape of the bottle;
    forming the interior recess in the bottle by advancing a recess forming rod through a hole in the end flange surface and into the neck forming cavity; and
    creating a dispensing hole in the interior recess by advancing a punch through a hole in an end face of the recess forming rod.

2. The method of claim 1 wherein said introducing and said forming steps are performed substantially simultaneously.

3. The method of claim 1 further comprising the steps of retracting the punch and allowing the recess forming rod to remain in its advanced position while the molded bottle cools and solidifies.

4. The method of claim 3 further comprising the step of withdrawing the recess forming rod and permitting pressurized air to drain from the bottle.

5. The method of claim 1 further comprising the step of retracting the punch while retaining a slug created during said creating step on an undercut in the punch thereby removing the slug from inside the bottle.

6. The method of claim 5 further comprising the step of injecting pressurized air through an inner channel in the punch in order to blow the slug off the end of the punch.

7. A method for blow molding bottles having a hole formed in a molded interior recess extending from a top face of a bottle neck, said method comprising the steps of:
    providing a mold having a neck forming cavity with an end flange surface therein;
    disposing a parison of molten material within the mold;
    introducing pressurized fluid into the parison to expand it against the mold walls, thereby forming a final shape of the bottle;
    forming the interior recess in the bottle by advancing a recess forming rod through a hole in the end flange surface and into the neck forming cavity;
    creating a dispensing hole in the interior recess by advancing a punch through a hole in an end face of the recess forming rod;
    allowing the recess forming rod to remain in its advanced position while the molded bottle cools and solidifies;
    retracting the punch while retaining a slug created during said creating step on an undercut in the punch thereby removing the slug from inside the bottle;
    injecting pressurized air through an inner channel in the punch in order to blow the slug off the end of the punch; and
    withdrawing the recess forming rod and permitting pressurized air to drain from the bottle.

8. The method of claim 7 wherein said introducing and said forming steps are performed substantially simultaneously.

9. The method of claim 7 wherein the pressurized fluid is introduced into the parison through the punch.

* * * * *